May 31, 1932. R. FAHR ET AL 1,861,156
APPARATUS FOR THE SEPARATION OF FINELY DIVIDED SUBSTANCES
Filed Sept. 27, 1929
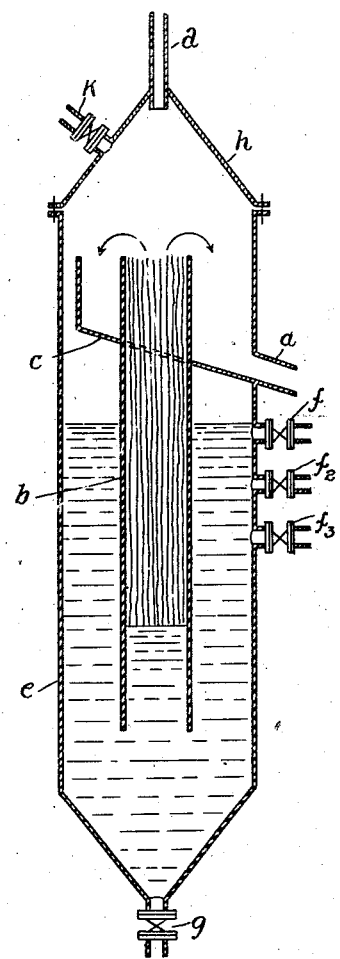
Rudolf Fahr
Rudolf Keinke
INVENTORS Patented May 31, 1932

1,861,156

UNITED STATES PATENT OFFICE

RUDOLF FAHR AND RUDOLF KEINKE, OF NEUROESSEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

APPARATUS FOR THE SEPARATION OF FINELY DIVIDED SUBSTANCES

Application filed September 27, 1929, Serial No. 395,718, and in Germany October 20, 1928.

The present invention relates to improvements in apparatus for the separation of finely divided solid substances.

When it is desired continuously to free large quantities of liquids for example from suspended or emulsified materials such as impurities, precipitates and the like, which are present in small quantities, the usual industrial filtration or clarification processes are frequently not sufficiently economical. Moreover, if the suspended materials are very finely dispersed, for example colloidal, the industrial difficulties in separation are still greater, because colloidal substances can only be filtered imperfectly or very slowly, so that with large quantities of liquids the output of a filtration apparatus is quite insufficient. If it is attempted to clarify liquids of this nature by allowing them to settle, excessively large settling vessels and very long periods of time are necessary in consequence of the small sinking power of the suspended materials. Further, it is not always advisable to expose the liquids to be clarified to contact with air for a long period of time, because their properties are frequently altered thereby in an injurious manner.

In accordance with the present invention the separation of the suspended materials, precipitates, and the like which are to be removed, is effected in a simple manner by utilizing the foaming power of the turbid liquid which power is naturally present or which may be produced artificially in any suitable manner. The turbid liquid is allowed to fall as a free jet into the clarified liquid which is in a container, from such a height that an ascending column of foam is produced in opposition to the jet of liquid which is falling in, and this foam takes up and removes the suspended matter. Care should be taken that neither the jet of liquid which is falling in, nor the ascending foam, meets with any resistance from projecting parts of the apparatus, since experience shews that parts of this nature have an injurious effect on the foam; care should be taken that a particularly high column of foam can be formed without any obstruction, because in this way the most valuable results are obtained by the process in accordance with the present invention.

It is preferable to employ a high narrow cylindrical vessel for the production of the foam, since in a vessel of this kind a column of foam of several metres in height can readily be produced. The kinetic energy of the jet of liquid which is falling in is completely consumed by the production of an extensive subdivision and by the continuous formation of fresh foam. The foam ascends in the narrow cylindrical vessel and thus filters the turbid liquid which is flowing down over it and in it. A long column of foam has the advantage that the suspended materials carried along in the descending liquid which is in counter current to the vertically ascending foam, remain in contact with the foam for the longest possible time, and are therefore completely taken up by the same. Below the column of foam the clarified liquid remains entirely at rest. The foam which flows off at the top through an overflow is so much enriched in the removable materials that the mixture can now readily be separated by filtration and decantation, particularly because by the action of the foam and on account of the alteration in the concentration of the suspended materials the latter conglomerate and lose their finely dispersed condition and can thus be easily separated. The clarified solution may be continuously drawn off at some distance below the junction of the layers of liquid and foam, or may be drawn off from a second vessel which communicates with the first.

The nature of the invention will be further described with reference to the accompanying drawing which shews by way of example vertical sectional view of an arrangement of apparatus in accordance with this invention but the invention is not restricted to this arrangement.

The liquid to be clarified is spurted through a pipe $a$ as shewn by the arrow into a cylindrical vessel $b$ whereby foam is produced and this ascends over the top of the vessel $b$, collects in the overflow $c$ and flows out through an opening $d$. The clarified liquid collects in a mantle vessel $e$ surrounding the vessel $b$ and is drawn off through one or more lateral outflow openings $f, f_2$ and $f_3$, the plurality of which is preferable since the level of the liquid which is to be maintained in the vessel $e$ depends on the requisite height of the column of foam, which may be different for different liquids. Moreover even with one and the same liquid the provision of several outflow openings constitutes a convenient means of varying within wide limits the quantity of foam which overflows at the top of vessel $b$, and thus of regulating its content of the materials to be removed. A small part of the suspended materials which is not taken up by the given proportion of foam collects in the conical lower part of the vessel $e$, and may be removed periodically or continuously with the aid of the outlet $g$. The shape of the vessel $b$ may be different according to the action required. Thus for example the vessel $b$ may have a small diameter when the solutions under treatment possess a low foaming capacity or when difficultly separable solid particles are contained therein, whereas the vessel $b$ may be of a conical shape, the wider diameter being at its top, when solutions with a good foaming capacity are to be worked.

When liquids are to be treated which must be clarified with the exclusion of air and in the presence of a certain gas, the apparatus is closed by means of a hood $h$ in which is a pipe $k$ through which the gas concerned is led in so that the whole apparatus is filled with the atmosphere of the desired gas.

When working with liquids having small foaming power the inlet $a$ for the liquid may be advantageously subdivided into several pipes. Moreover it is possible to increase the formation and loosening of the foam by passing gases, preferably in a state of fine division, for example air, into the vessel $b$ from the lower part thereof.

The process in accordance with the present invention is excellently suitable for the removal of finely divided sulphur from solutions such as are obtained for example by causing sulphur dioxide and hydrogen sulphide to act on a solution of one or more thiosulphates of metals, the sulphides of which are soluble in water. By this process sulphuretted hydrogen is removed from gases by oxidation to sulphur by means of sulphur dioxide with the aid of solutions of ammonium thio-sulphate. The sulphur formed in this manner can be continuously recovered in a simple manner in accordance with the present invention with a comparatively small apparatus arranged in the course of the solution circulated in a washing tower for gas; in this manner a special expenditure of energy for charging the apparatus with solution is not necessary. This arrangement has great advantages in contrast to a filtration apparatus which on account of the large quantities of solution which are necessary for carrying out this gas purification process, is very expensive in operation.

The process in accordance with the present invention may also be employed for the separation of different kinds of suspensions from each other, or for the separation of finely powdered solid substances which for this purpose are previously made into suspensions with suitable liquids. By a suitable addition for example of oily materials some part of the solids is rendered in capable of being wetted so that it is carried along with the foam while the other part collects at the bottom of the apparatus.

A separation process of this kind may be advantageously employed for example for the production of pure sulphur by the removal of sulphuretted hydrogen from industrial gases with the employment of suspensions of iron oxide or iron hydroxide in alkaline solutions. By washing a gas containing sulphuretted hydrogen with a suspension of this nature the corresponding iron sulphide is obtained. By regenerating the suspension of metal sulphide by passing in finely dispersed air into the washing liquid, elementary sulphur separates out which contains considerable quantities of iron hydroxide. In order to recover commercially useful sulphur from this mixture, troublesome purification processes are necessary. The separation of the iron hydroxide and the recovery of a pure sulphur is effected on the contrary in a very simple manner by subjecting the washing liquid to a treatment in accordance with the present invention, for example in the apparatus hereinbefore described. The sulphur is taken up, if desired after adding a wetting agent, in a very pure state by the foam produced and is carried up to the upper part of the apparatus, while the iron oxide or hydroxide collects in the lower conical part of the apparatus from whence it is periodically or continuously drawn off.

We claim:—
1. An apparatus suitable for the separation of finely divided solid substances from liquids, which comprises a mantle vessel, a pipe the length of which is several times as great as its diameter, vertically arranged in said vessel, an overflow collector arranged around and near the upper end of said pipe, an injector pipe vertically arranged and ending at some distance above the upper end of said pipe, and an overflow in the wall of said vessel at a level substantially below the upper end but above the lower end of said pipe.

2. An apparatus suitable for the separation of finely divided solid substances from liquids, which comprises a mantle vessel, a pipe the length of which is several times as great as its diameter, vertically arranged in said vessel, said mantle vessel completely surrounding said pipe, an overflow collector arranged around and near the upper end of said pipe and passing through the wall of said vessel, an injector pipe passing through the wall of said vessel, arranged vertically and ending at some distance above the upper end of said pipe, and an overflow in the wall of said vessel at a level substantially below the upper end but above the lower end of said pipe.

In testimony whereof we have hereunto set our hands.

RUDOLF FAHR.
RUDOLF KEINKE.